(12) United States Patent
Bernard et al.

(10) Patent No.: US 7,289,958 B2
(45) Date of Patent: Oct. 30, 2007

(54) AUTOMATIC LANGUAGE INDEPENDENT TRIPHONE TRAINING USING A PHONETIC TABLE

(75) Inventors: Alexis P. Bernard, Dallas, TX (US); Lorin P. Netsch, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 843 days.

(21) Appl. No.: 10/680,392

(22) Filed: Oct. 7, 2003

(65) Prior Publication Data

US 2005/0075887 A1    Apr. 7, 2005

(51) Int. Cl.
*G10L 15/00* (2006.01)

(52) U.S. Cl. ................. 704/255; 704/257

(58) Field of Classification Search ........ 704/255, 704/257

See application file for complete search history.

(56) References Cited

U.S. PATENT DOCUMENTS

| | | | |
|---|---|---|---|
| 5,293,584 A * | 3/1994 | Brown et al. | 704/277 |
| 6,085,160 A * | 7/2000 | D'hoore et al. | 704/256.2 |
| 6,941,264 B2 * | 9/2005 | Konopka et al. | 704/243 |
| 2002/0040296 A1 * | 4/2002 | Kienappel | 704/220 |

* cited by examiner

*Primary Examiner*—Daniel Abebe
(74) *Attorney, Agent, or Firm*—W. James Brady, III; Frederick J. Telecky, Jr.

(57) ABSTRACT

A method for training acoustic models for a new target language is provided using a phonetic table, which characterizes the phones, used in one or more reference language(s) with respect to their articulatory properties; a phonetic table, which characterizes the phones used in the target language with respect to their articulatory properties; a set of trained monophones for the reference language(s); and a database of sentences in the target language and its phonetic transcription. With these inputs, the new method completely and automatically takes care of the steps of monophone seeding and triphone clustering and machine intensive training steps involved in triphone acoustic training.

9 Claims, 5 Drawing Sheets

| | | | | | | | | | | |
|---|---|---|---|---|---|---|---|---|---|---|
| VOWELS AND DIPHTHONGS | | | | | | | | | | |
| iy | 7 | vowel | high | front | I | voiced | cont | unround | round | lax |
| ih | 6 | vowel | high | front | I | voiced | cont | unround | short | tense |
| uw | 7 | vowel | high | back | U | voiced | cont | round | round | lax |
| uh | 6 | vowel | high | back | U | voiced | cont | round | short | tense |
| ey | 8 | vowel | mid | front | E | voiced | cont | unround | round | lax |
| eh | 7 | vowel | mid | front | E | voiced | cont | unround | short | tense |
| ow | 8 | vowel | mid | back | O | voiced | cont | round | round | lax |
| ao | 8 | vowel | mid | back | O | voiced | cont | round | round | lax |
| ah | 6 | vowel | mid | central | A | voiced | cont | unround | short | tense |
| ae | 9 | vowel | low | front | A | voiced | cont | unround | short | lax |
| aa | 8 | vowel | low | central | A | voiced | cont | unround | short | lax |
| ax | 5 | vowel | low | central | A | voiced | cont | unround | short | lax |
| er | 7 | vowel | mid | central | E | voiced | cont | unround | round | tense |
| ay | 8 | dipht | | | A | voiced | ncont | | | |
| aw | 10 | dipht | | | A | voiced | ncont | | | |
| CONSONANTS AND SEMIVOWELS | | | | | | | | | | |
| p | 5 | cons | stop | front | bilabial | unv | ncont | fortis | ncoron | ant | unst |
| b | 5 | cons | stop | front | labial | voiced | ncont | lenis | ncoron | ant | unst |
| t | 5 | cons | stop | central | alveolar | unv | ncont | fortis | coron | nant | unst |
| d | 5 | cons | stop | central | alveolar | voiced | ncont | lenis | coron | nant | unst |
| k | 5 | cons | stop | back | velar | unv | ncont | fortis | ncoron | nant | unst |
| g | 5 | cons | stop | back | velar | voiced | ncont | lenis | ncoron | nant | unst |
| ch | 7 | cons | affric | central | alveopalatal | unv | ncont | fortis | coron | nant | strid |
| jh | 5 | cons | affric | central | alveopalatal | voiced | ncont | lenis | coron | nant | strid |
| f | 7 | cons | fricat | front | labiodental | unv | cont | fortis | ncoron | ant | nstrid |
| v | 5 | cons | fricat | front | labiodental | voiced | cont | lenis | ncoron | ant | nstrid |
| th | 7 | cons | fricat | front | interdental | unv | cont | fortis | ncoron | ant | nstrid |
| dh | 5 | cons | fricat | front | interdental | voiced | cont | lenis | ncoron | ant | nstrid |
| s | 8 | cons | fricat | central | alveolar | unv | cont | fortis | coron | nant | strid |
| z | 6 | cons | fricat | central | alveolar | voiced | cont | lenis | coron | nant | strid |
| sh | 8 | cons | fricat | central | alveopalatal | unv | cont | fortis | coron | nant | strid |
| zh | 7 | cons | fricat | central | alveopalatal | voiced | cont | lenis | coron | nant | strid |
| hh | 5 | cons | fricat | back | velar | unv | ncont | fortis | ncoron | nant | unst |
| m | 5 | cons | nasal | front | bilabial | voiced | cont | ufl | ncoron | ant | unst |
| n | 5 | cons | nasal | central | alveolar | voiced | cont | ufl | coron | nant | unst |
| en | 6 | cons | nasal | central | alveolar | voiced | ncont | ufl | ncoron | nant | unst |
| ng | 6 | cons | nasal | back | velar | voiced | cont | ufl | ncoron | nant | unst |
| l | 6 | semiv | liquid | central | alveolar | voiced | ncont | ufl | coron | nant | unst |
| el | 7 | semiv | liquid | central | alveolar | voiced | ncont | ufl | coron | nant | unst |
| w | 6 | semiv | liquid | front | bilabial | voiced | ncont | ufl | coron | ant | unst |
| y | 6 | semiv | glide | central | alveopalatal | voiced | ncont | ufl | coron | nant | unst |
| r | 6 | semiv | retro | back | alveolar | voiced | ncont | ufl | ncoron | nant | unst |
| CLOSURES, SILENCE AND SHORT PAUSE | | | | | | | | | | |
| vcl | 5 | closure | voiced | | | | | | | |
| cl | 5 | closure | unv | | | | | | | |
| sil | 5 | silence | | | | | | | | |
| sp | 3 | pause | | | | | | | | |

FIG. 4

| | | | | VOWELS AND DIPHTHONGS | | | | | | | |
|---|---|---|---|---|---|---|---|---|---|---|---|
| iy | 7 | vowel | high | front | I | voiced | cont | unround | long | tense | |
| ih | 6 | vowel | high | front | I | voiced | cont | unround | short | lax | |
| ey | 8 | vowel | mid | front | E | voiced | cont | unround | long | tense | |
| eh | 7 | vowel | mid | front | E | voiced | cont | unround | short | lax | |
| ao | 8 | vowel | mid | back | O | voiced | cont | round | --- | lax | |
| ae | 9 | vowel | low | front | A | voiced | cont | unround | short | lax | |
| aa | 8 | vowel | low | central | A | voiced | cont | unround | --- | lax | |
| ax | 5 | vowel | mid | central | R | voiced | cont | unround | short | lax | |
| er | 7 | vowel | mid | central | E | voiced | cont | unround | long | tense | |
| an | 8 | vowel | mid | back | A | voiced | cont | round | short | tense | nasal |
| ee | 8 | vowel | mid | front | E | voiced | cont | unround | long | tense | |
| eu | 6 | vowel | mid | front | E | voiced | ncont | round | long | tense | |
| in | 6 | vowel | high | central | I | voiced | cont | unround | short | lax | nasal |
| iu | 7 | vowel | high | front | U | voiced | cont | round | short | lax | |
| yu | 7 | vowel | high | front | I | voiced | cont | round | long | tense | |
| oe | 7 | vowel | mid | front | O | voiced | cont | round | short | lax | |
| on | 8 | vowel | high | back | O | voiced | cont | round | short | tense | nasal |
| oo | 8 | vowel | mid | back | O | voiced | cont | round | long | tense | |
| un | 6 | vowel | high | front | U | voiced | cont | round | short | tense | nasal |
| uu | 7 | vowel | high | back | U | voiced | cont | round | long | tense | |
| ux | 6 | vowel | mid | back | R | voiced | cont | round | short | lax | |
| ai | 8 | dipht | | | A | voiced | ncont | | | | |
| oi | 10 | dipht | | | O | voiced | ncont | | | | |
| au | 8 | dipht | | | A | voiced | ncont | | | | |

| | | | | CONSONANTS AND SEMIVOWELS | | | | | | | |
|---|---|---|---|---|---|---|---|---|---|---|---|
| p | 5 | cons | stop | front | bilabial | unv | ncont | fortis | ncoron | ant | unst |
| b | 5 | cons | stop | front | bilabial | voiced | ncont | lenis | ncoron | ant | unst |
| t | 5 | cons | stop | central | alveolar | unv | ncont | fortis | coron | nant | unst |
| d | 5 | cons | stop | central | alveolar | voiced | ncont | lenis | coron | nant | unst |
| k | 5 | cons | stop | back | velar | unv | ncont | fortis | ncoron | nant | unst |
| g | 5 | cons | stop | back | velar | voiced | ncont | lenis | ncoron | nant | unst |
| ch | 7 | cons | affricate | central | alveopalatal | unv | ncont | fortis | coron | nant | strid |
| jh | 5 | cons | affricate | central | alveopalatal | voiced | ncont | lenis | coron | nant | strid |
| f | 7 | cons | fricative | front | labiodental | unv | cont | fortis | ncoron | ant | nstrid |
| v | 7 | cons | fricative | front | labiodental | voiced | cont | lenis | ncoron | ant | nstrid |
| s | 8 | cons | fricative | central | alveolar | unv | cont | fortis | coron | nant | strid |
| z | 6 | cons | fricative | central | alveolar | voiced | cont | lenis | coron | nant | strid |
| sh | 8 | cons | fricative | central | alveopalatal | unv | cont | fortis | coron | nant | strid |
| zh | 7 | cons | fricative | central | alveopalatal | voiced | cont | lenis | coron | nant | strid |
| h | 5 | cons | glide | back | velar | unv | ncont | fortis | ncoron | nant | unst |
| m | 5 | cons | nasal | front | bilabial | voiced | cont | ufl | ncoron | ant | unst |
| n | 5 | cons | nasal | central | alveopalatal | voiced | cont | ufl | coron | nant | unst |
| ng | 6 | cons | nasal | back | velar | voiced | cont | ufl | ncoron | nant | unst |
| en | 6 | cons | nasal | central | alveolar | voiced | ncont | ufl | ncoron | nant | unst |
| l | 6 | semiv | liquid | central | alveolar | voiced | ncont | ufl | coron | nant | unst |
| w | 6 | semiv | liquid | front | bilabial | voiced | ncont | ufl | coron | ant | unst |
| y | 6 | semiv | glide | central | alveopalatal | voiced | ncont | ufl | coron | nant | unst |
| r | 6 | cons | fricative | back | alveolar | voiced | ncont | ufl | ncoron | nant | unst |
| pf | 5 | cons | fricative | front | bilabial | unv | ncont | fortis | ncoron | ant | nstrid |
| ts | 8 | cons | fricative | central | alveolar | unv | ncont | fortis | coron | nant | strid |
| x | 5 | cons | fricative | back | velar | unv | cont | lenis | ncoron | nant | nstrid |

| | | | CLOSURES, SILENCE AND SHORT PAUSE | |
|---|---|---|---|---|
| vcl | 5 | closure | voiced | |
| cl | 5 | closure | unv | |
| sil | 5 | silence | | |
| sp | 3 | pause | | |

FIG. 8                                         © 2003 TEXAS INSTRUMENTS

| QUESTION NAME | QUESTION DEFINITION | QUESTION NAME | QUESTION DEFINITION |
|---|---|---|---|
| Boundary | SILENCE | Unvcd_Closure | CLOSURE & UNVOICED |
| Vcd_Closure | CLOSURE & VOICED | Closure | CLOSURE |
| Front_stop | FRONT & STOP | Central_stop | CENTRAL & STOP |
| Back_stop | BACK & STOP | Affricate | AFFRICATE |
| Stop | STOP | Vcd_stop | VOICED & STOP |
| Unvcd_stop | UNVOICED & STOP | Nasal | NASAL |
| Front_nasal | FRONT & NASAL | Back_nasal | BACK & NASAL |
| Fric | FRICATIVE, AFFRICATE | Fricative | FRICATIVE |
| Voiced_Fric | (FRICATIVE, AFFRICATE) & VOICED | Vowel | VOWEL |
| Unvoiced_Fric | (FRICATIVE, AFFRICATE) & UNVOICED | Front_vowel | FRONT & VOWEL |
| Front_Fric | (FRICATIVE, AFFRICATE) & FRONT | Central_vowel | CENTRAL & VOWEL |
| Central_Fric | (FRICATIVE, AFFRICATE) & CENTRAL | Back_vowel | BACK & VOWEL |
| Back_Fric | (FRICATIVE, AFFRICATE) & BACK | Liquid | LIQUID |
| Central_cons | CENTRAL & CONSONANT | Back_cons | BACK & CONSONANT |
| Front_cons | FRONT & CONSONANT | High_vowel | HIGH & VOWEL |
| Mid_vowel | MID & VOWEL | Low_vowel | LOW & VOWEL |
| Front | FRONT | Central | CENTRAL |
| Back | BACK | Fortis | FORTIS |
| Lenis | LENIS | | |
| Unfortlenis | UNFORTLENIS | Coronal | CORONAL |
| Noncoronal | NON_CORONAL | Anterior | ANTERIOR |
| Nonanterior | NON_ANTERIOR | Continuent | CONTINUENT |
| Noncontinuent | NON_CONTINUENT | Strident | STRIDENT |
| Unstrident | UNSTRIDENT | Nonstrident | NONSTRIDENT |
| Glide | GLIDE | Syllabic | SYLLABIC |
| Unvoiced_cons | UNVOICED & CONSONANT | Voiced_cons | VOICED & CONSONANT |
| Unvoiced | UNVOICED | Voiced | VOICED |
| Long | LONG | Short | SHORT |
| Diphtong | DIPHTONGUE | Semivowel | SEMIVOWEL |
| High | HIGH | Mid | MID |
| Low | LOW | Rounded | ROUNDED |
| Unrounded | UNROUNDED | Vocalic | VOWEL, GUIDE, LIQUID |
| Bilabial | BILABIAL | Labdental | LABDENTAL |
| Intdental | INTDENTAL | Alveolar | ALVEOLAR |
| Alvpalatal | ALVPALATAL | Velar | VELAR |
| Nasalized_vowel | NASALIZED | Nasalized | NASALIZED, NASAL |
| Tense | TENSE | Lax | LAX |
| Front_long | FRONT & LONG | Mid_long | MID & LONG |
| Back_long | BACK & LONG | High_long | HIGH & LONG |
| Central_long | CENTRAL & LONG | Low_long | LOW & LONG |
| Front_short | FRONT & SHORT | Mid_short | MID & SHORT |
| Back_short | BACK & SHORT | High_short | HIGH & SHORT |
| Central_short | CENTRAL & SHORT | Low_short | LOW & SHORT |
| I_vowel | I | E_vowel | E |
| A_vowel | A | U_vowel | U |
| O_vowel | O | R_vowel | R |
| iy | iy | ih | ih |
| ⋮ | ⋮ | ⋮ | ⋮ |

AUTOMATIC LANGUAGE INDEPENDENT TRIPHONE TRAINING USING A PHONETIC TABLE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF INVENTION

This invention relates to training acoustic phonetic models for a new language and more particularly to automatic language independent triphone training for speech recognition.

BACKGROUND OF INVENTION

Automatic speech recognition (ASR) is usually accomplished by determining the words that were most likely spoken, given a speech signal. This is done by comparing a set of parameters describing the speech signal with a set of trained acoustic model parameters. Accurate speech recognition requires that the trained acoustic models be able to distinguish the spoken words successfully. Hence, much effort is expended to produce acoustic models that provide the level of performance desired. The units of trained acoustic models may correspond to words, monophones, biphones or triphones. For large vocabulary speech recognition applications, triphone acoustic modeling, which comprehends the prior and subsequent phone context of a given phone, outperforms monophone modeling, and so triphones are the acoustic models of choice in such applications.

While triphones provide better large vocabulary recognition, the number of triphones is often larger than the number of monophones by two orders of magnitude. For example, if a language requires 50 monophones for its representation, there will likely be in the range of 5000 triphones in the language. Training thousands of triphones in any language is complex and time-consuming. Some steps are machine intensive; while others require a great deal of human intervention, which is error-prone. Such elements impact the cost and time to market associated with training acoustic triphone models for any new language.

Current acoustic training techniques have been known and published for some time. See for example, S. Young, D. Kershaw, J. Odell, D. Ollason V. Valttchev and P. Woodland, *The HTK Book* (*Version* 3.0), Cambridge, England, July 2000. Monophone seeding constitutes the foundation of any training operation. Ideally, monophone seeding provides the subsequent steps in the training algorithm good monophone models in the language of consideration. Such monophone models can easily be estimated if one possesses a database that has been labeled and time marked all the way to the monophone level. This labeling and time marking requires extensive human intervention to ensure correct labeling of the monophones within an utterance and the correct location of the acoustic signal corresponding to each monophone. Because of the need for human intervention and the need for large databases for triphone training, such labeling and time marking is costly and so it is rarely performed.

If such hand labeling is not available, seed monophones can be obtained through bootstrapping, which makes an estimate of the monophones using other already trained acoustic models depending on their acoustic similarities. While this technique is useful if the monophone similarities can be clearly estimated, it often requires a great deal of human interaction both to analyze which monophones are similar acoustically and to adapt topology of the reference model to fit with that of the target model.

Other current methods adapt the acoustic information of an existing set of monophone models in a reference language using a small database in the target language. However, the time and cost advantage of the adaptation technique is usually obtained at the cost of reduced recognition performance in the target language, since the monophone models are not optimal for the new language.

If no other method is available, monophone seeding may use a simple "flat start" method, whereby one initial model is constructed based on global statistics of the entire target training database. This model is duplicated to form the model for all monophones. This technique is rarely used for high-end speech recognition systems because it significantly impacts recognition performance.

Existing triphone training techniques require several steps. The first step is often to duplicate a set of trained monophone acoustic models for each triphone context, thus producing the initial triphone models. The triphone models can then be trained. However, the initial triphone models have a significant amount of monophone acoustic context, which can result in sub optimally trained triphone models.

The large number of triphones results in an excessive number of model parameters that must be trained, which requires extremely large training databases in order to successfully estimate the parameters. In order to reduce the number of parameters needed to represent the triphone models, after preliminary training of the triphone models, another procedure clusters the parameters. During clustering, parameters of similar triphones are linked together to obtain a joint and therefore more robust estimate of the clustered triphone parameters. The success of clustering is based on correctly identifying the parameters that are correlated with each other and should be grouped.

Existing methods of clustering triphone model parameters require significant human involvement. Such techniques can be either data driven or tree based. In the first case, triphones that tend to produce similar speech features are clustered. One limitation of data driven clustering is that it does not deal with triphones for which there are no examples in the training data. In the second case, a phonetic binary decision tree is built, with yes/no question attached at each node. All triphones in the same leaf node are then clustered. With such a tree, any triphone in the language can be constructed, if the tree questions are based on articulatory features of phones. Before any tree building can take place, all of the possible phonetic questions must be manually determined depending on the specific set of phonemes characterizing the target language and their articulatory phonetic characteristic (e.g. voiced/unvoiced, place and manner of articulation, position of the tongue and jaw, strident, open jaw, round lips, long . . . ).

The disadvantage of direct application of these existing training techniques is time and cost associated with human intervention which needs to be repeated for each additional language. In addition, the resulting acoustic model sets are not optimized by selecting the best candidate from the large multitude of possible clustering candidates, resulting in degraded speech recognition performance and/or excessive model size.

SUMMARY OF INVENTION

In accordance with one embodiment of the present invention, phonetic tables of one or more reference languages and a phonetic table for a new target language are derived and encoded. Given a speech database collected in the new language and a phonetic transcription of the database, novel processing methods using table correspondence generate seed monophone phonetic models specific to the new target language. The method of the invention then trains the monophone phonetic models automatically using existing known training techniques. Subsequent to monophone model training, processing methods of the invention automatically generate accurate seed triphone models specific to the language. Additional processing methods of the invention utilize the phonetic table information to determine optimal clustering of the triphone phonetic model parameters. The method of the invention then automatically trains the triphone phonetic models using known training methods. Further, additional methods of the invention incorporate steps to optimize the resulting trained phonetic models to improve speech recognition performance within the training of the triphone acoustic models.

DESCRIPTION OF DRAWINGS

FIG. 8 illustrates a table with a universal list of articulatory questions.

DESCRIPTION OF PREFERRED EMBODIMENTS

Figure 1:
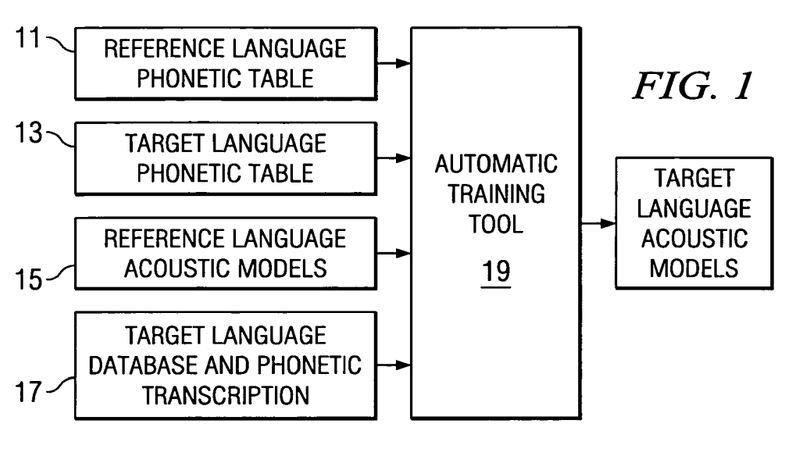
FIG. 1 is a block diagram of the proposed method performing automatic training in any language.

Referring to FIG. 1 there is illustrated an overall diagram of the method. The method requires as input the following elements:

phonetic tables 11 which characterize the phones, used in one or more reference languages with respect to their model and articulatory properties;

a phonetic table 13, which characterizes the phones used in the target language with respect to its model and articulatory properties;

a set of trained monophones 15 for each reference language; and a database 17 of sentences in the target language and its phonetic transcription.

Figure 2:
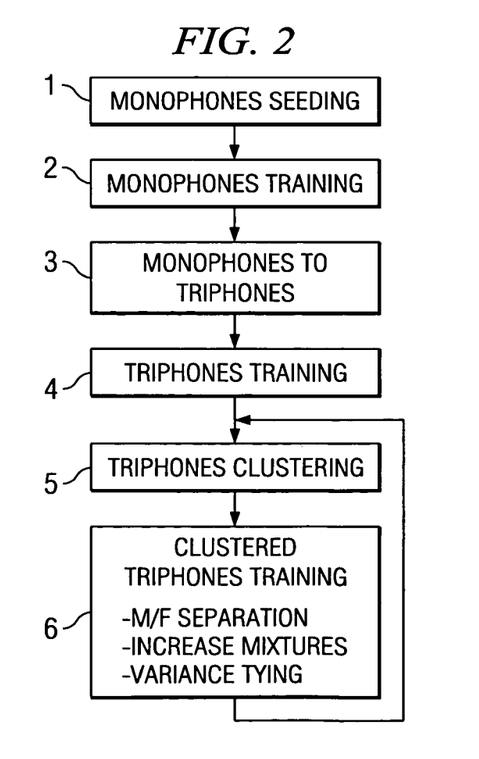
FIG. 2 is a general block diagram of the steps involved with triphones acoustic training.

With these inputs, the method of the invention 19 completely and automatically implements all remaining steps of seed monophone model generation (Step 1), monophone training (Step 2), seed triphone model generation, (Steps 3 and 4) triphone clustering (Step 5), and machine intensive training and optimization steps (Step 6) involved in triphone acoustic model training. These steps are illustrated in FIG. 2.

Phonetic Table

Figure 3:
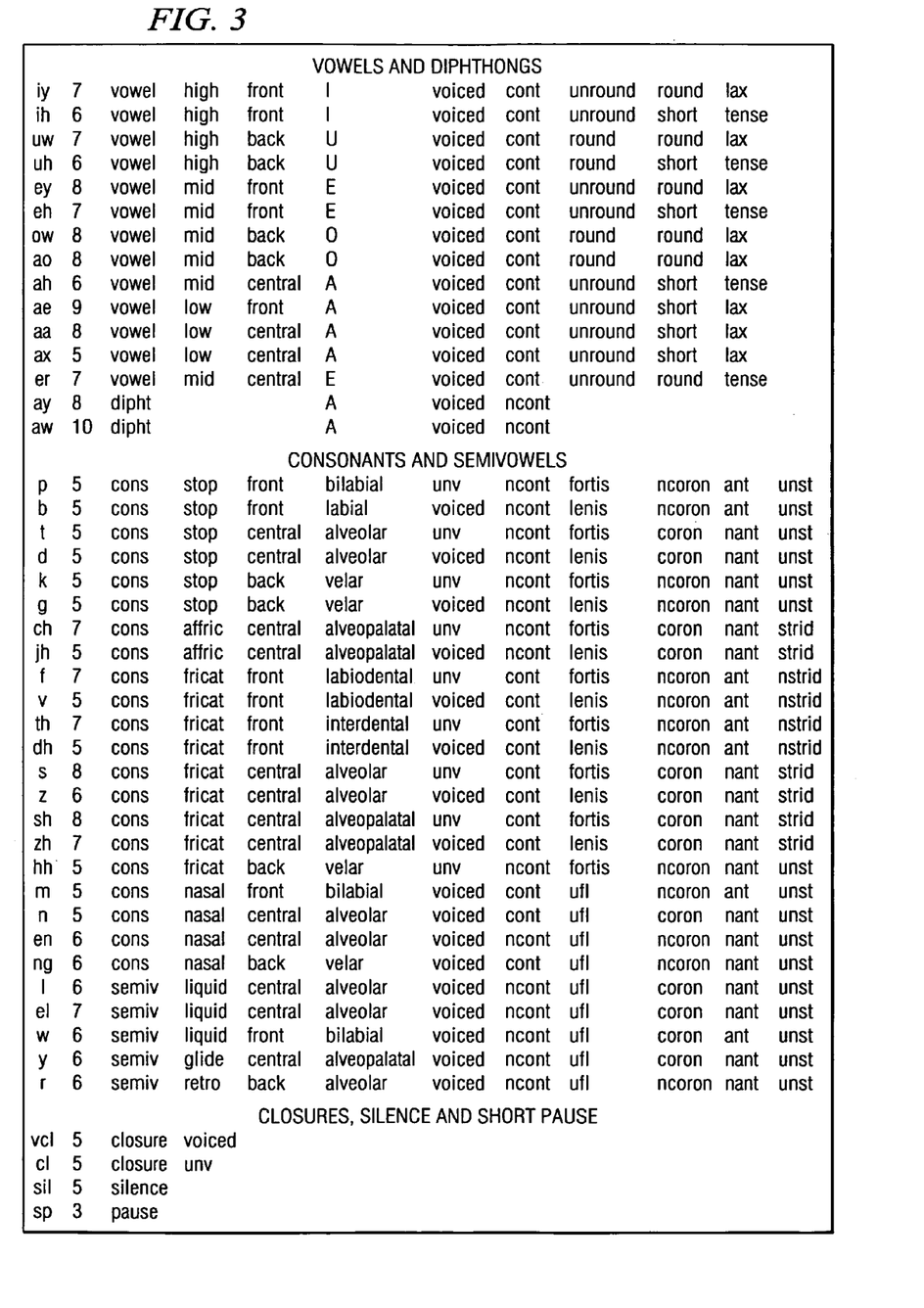
FIG. 3 is a phonetic table for the English language.

A novel aspect of the invention is creation of a phonetic table for each of the existing reference languages for which acoustic models have already been trained, and a phonetic table describing the phonetic structure of the target language. FIG. 3 gives an example of the phonetic table designed in order to describe the English language according to articulatory criteria. The table in FIG. 3 is only one preferred embodiment of the concept according to the present invention. The table in FIG. 3 is subdivided into three classes of phones: vowels, consonants-semivowels, and silences and closures.

Classification of phones in any language is accomplished according to the following articulatory or phonetic properties that are shown in corresponding columns of the phonetic table for each class of phone:

Phone: The number of phones varies from language to language, and there may be different definitions of phone sets depending on fine distinctions. There are typically 43 phones in English, as shown in FIG. 3.

Topology: Number of states in the acoustic model, based on the nominal duration of the phone in the language. In the preferred embodiment, the acoustic phonetic models utilize well known Hidden Markov Modeling (HMM) techniques which represent the models as a sequence of states.

Class of phone: Vowel, diphthong, consonant, semi-vowel, or closure.

Length of phone: Short or long.

Position of jaw: High, mid, low.

Position of articulation: Front, central, back.

Vowel type: A, E, I, 0, U.

Voicing: Voiced and unvoiced.

Continuance: Continuant or non-continuant.

Rounding of the lips: Round or not.

Tension in cheeks: Tense or lax.

Nasality: Nasal or not.

Manner of articulation: Stop, affricate, fricative, nasal, liquid, retroflex, glide, or lateral.

Point of articulation: Bilabial, labial, velar, alveolar, labiodental, alveopalatal, dental, or nasal.

Syllabic: Whether or not a phone is syllabic.

Stridency: Strident, non-strident, or unstrident.

Zone of articulation: Anterior or non-anterior.

Position of front of the tongue: Whether the consonant is coronal or not.

Degree of muscular effort: Fortis, lenis, or neither.

For vowel sounds, the following classes apply, given in the order according to FIG. 3: phone, topology, class, position of the jaw, position of articulation, vowel type, voicing, continuance, length, tension and nasality.

For consonant sounds, the following classes apply: phone, topology, class, manner of articulation, position of articulation, voicing, continuance, muscular effort, position of the front of the tongue, zone of articulation and stridency.

Figure 4:
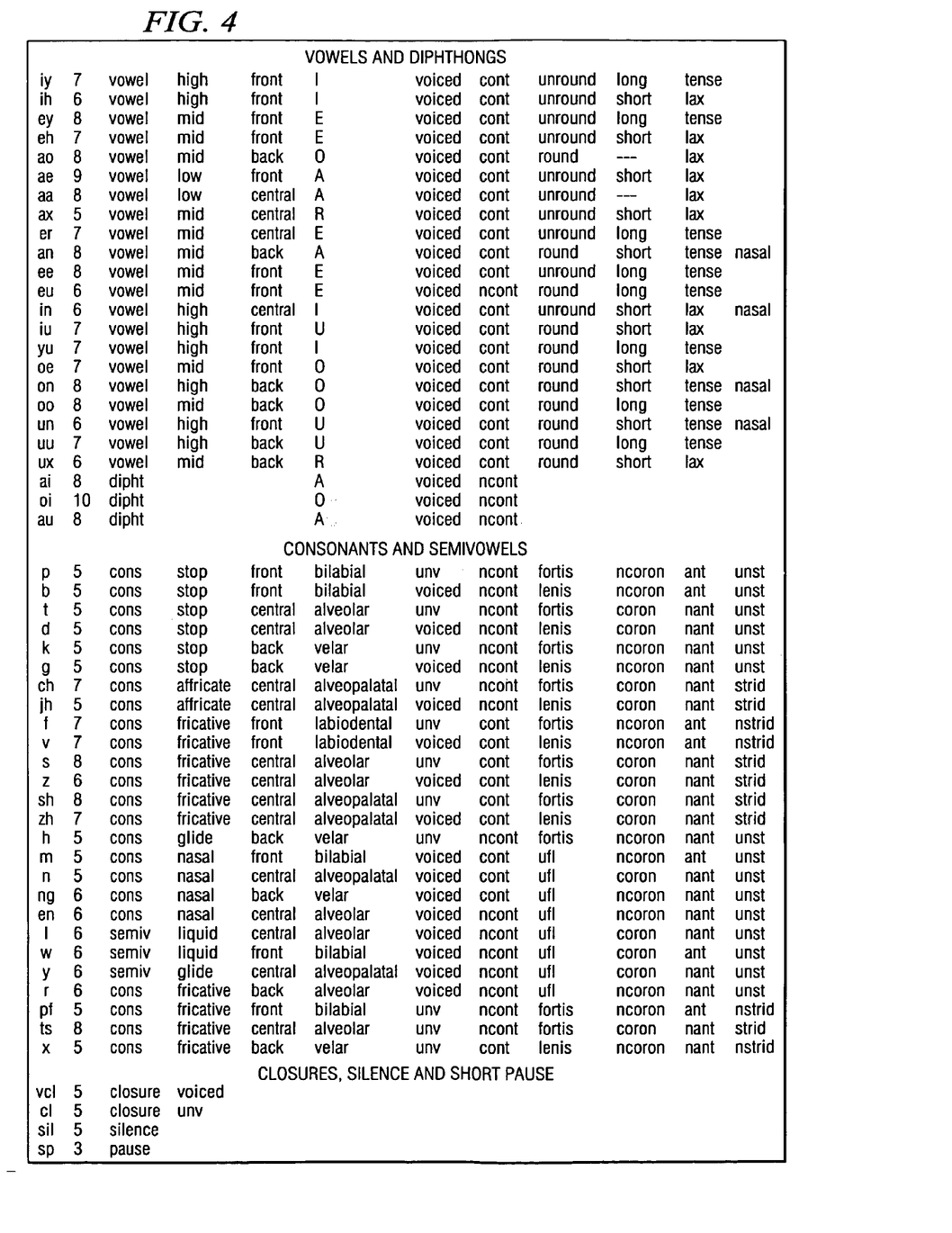
FIG. 4 is a phonetic table for the German language.

FIG. 4 illustrates a phonetic table for the German language. It includes a section for vowels and diphthongs, a section for consonants and semivowels, and a section for closures, silence and short pause.

Utilization of the Phonetic Table for Training Purposes

In accordance with the present invention the steps of monophone seeding, triphone seeding, and triphone clustering are automatically performed based on the phonetic tables of the reference and target languages. These phonetic tables are constructed in a manner such that they can be input to the processing method of the invention and accessed automatically.

Monophone Seeding

Figure 5:
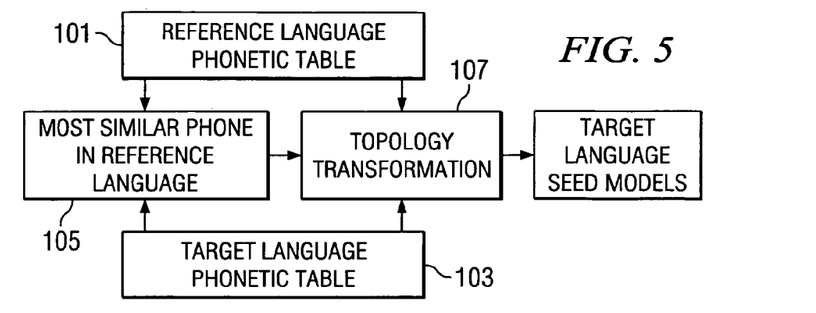
FIG. 5 is a block diagram of the proposed method for monophone seeding using the phonetic table of the target and reference languages.

In accordance with one embodiment of the present invention, presented in FIG. 5, applicants teach the use of the phonetic table 101 of one or more reference languages (for example the English table in FIG. 3) and the phonetic table 103 of the target language (for example the German table of FIG. 4) to create seed monophone models for the target language in two steps.

The first step 105 implements an automatic method of selecting, for each phone in the target language, the phone in one of the reference languages that is the most similar in terms of articulatory characteristics. The assumption behind this operation is that no matter what the language is, phones that are produced similarly will sound similar and have similar acoustic properties.

The second step 107 is based on the acoustic model topology (number of HMM states) of the target language monophone and its best match in the reference language. The topology of the monophone model in the reference language is modified in order to generate the seed monophone for the target language. The method of the preferred embodiment automatically transforms the reference monophone model using a weighted sum of the characteristics of each of the reference model states in such a way that the target monophone model represents a compressed or a stretched version of the reference monophone model.

Monophone Training

Once the seed monophones have been obtained, they are trained using the entire target language database. The training uses well-known training techniques for HMM models. See Rabiner, L. and Juang, B. H., 1993, Fundamentals of Speech Recognition, Prentice Hall, N.J.

Triphone Seeding

In order to improve speech recognition performance, especially in large vocabulary recognition, triphone models must be created and trained. Triphone models comprehend the phonetic context of preceding and trailing phones. So, for example, if in a particular word, a phone B is present, then the monophone model representation of the phone B occurring in the word is the monophone B. However, if in the word phone B is preceded by phone A, and followed by phone C, then we say that in the word the triphone consisting of phone A preceding phone B and followed by phone C occurs. This triphone is often denoted as A−B+C. Thus, the triphone representation of the phone B occurring in the word is the triphone A−B+C.

In order to create triphone models, processing must be performed to construct the necessary seed triphone models for each triphone occurring in the target language training database. In accordance with one embodiment of the present invention, presented in the left branch of FIG. 6, all seed triphones A−B+C are obtained by the well-known method of duplicating the monophone model B for each triphone context in which phone B appears in the target database.

Figure 6:
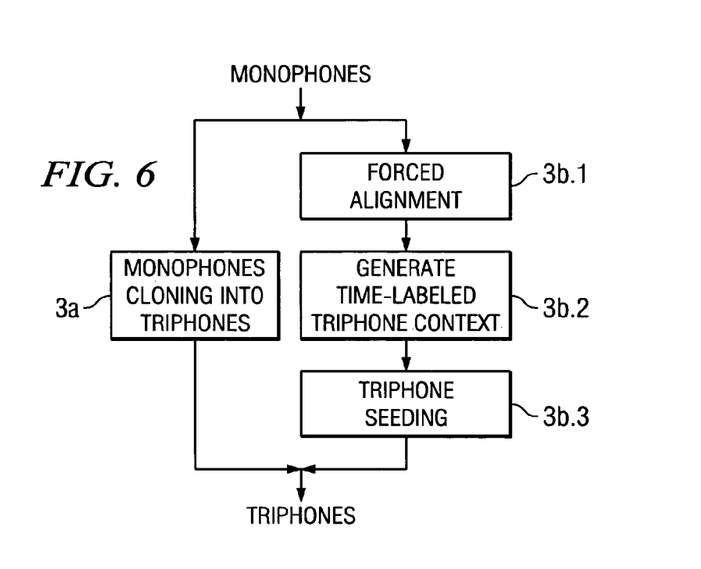
FIG. 6 illustrates Monophones to triphones transformation.

In accordance with another embodiment of the present invention, presented in the right branch of FIG. 6, applicants teach an optional method to improve the quality of the triphone model seeds. In the first step 3b.1, the existing trained monophone models are used to perform a forced alignment of each sentence in the target database. The resulting alignment provides the location of each monophone in the target speech corpus. Step 3b.2 then processes the alignment output to generate the triphone context of each monophone in the target database. The result of this processing is an accurate time marking of each triphone in the database. Finally, in step 3b.2 the time marking information of each triphone in the target database and the speech data in the target database are used to construct initial seed triphone models individually based on the acoustic information in the training database at each location the triphone occurs.

Triphone Training

Once the seed triphones have been obtained, they are trained using the entire target language database. The training uses well-known training techniques for HMM models. See Rabiner, L. and Juang, B. H., 1993, Fundamentals of Speech Recognition, Prentice Hall, N.J. cited above and S. Young, D. Kershaw, J. Odell, D. Ollason V. Valttchev and P. Woodland, The HTK Book (Version 3.0), Cambridge, England, July 2000.

Triphone Clustering

As mentioned earlier, tree based triphone clustering has two advantages. Clustering acoustically similar triphone parameters together yields a more robust estimate of the clustered triphone parameters after retraining, and tree based clustering provides a means to generate triphone models that may exist in the target language, but are not seen in the target training database.

In accordance with the present invention, the applicants teach a novel method for generating the tree based acoustic decision tree clustering questions automatically. Since tree based clustering questions are based on acoustic similarity, this can be inferred from the articulatory characteristics within the phonetic tables. Thus, the phonetic table can be re-used to build an acoustic decision tree adapted for each triphone sharing the same center monophone.

Figure 7:
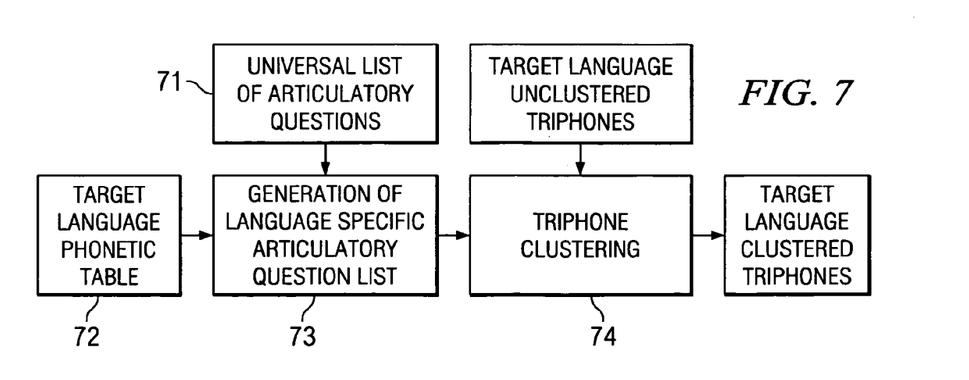
FIG. 7 is a block diagram of the proposed method for triphone clustering using the phonetic table of the target language and the universal list of articulatory questions.

The triphone clustering operation, presented in FIG. 7, is a three-step process: The first step generates a list of articulatory-based questions 71. Since the list is based on articulatory characteristics with categories shared among all languages, the list is language independent and can be referred to as the universal articulatory-based question list. A non-exhaustive example of such universal question list is presented in the table of FIG. 8. The second step is based on the phonetic table 72 of the target language, and transforms each question of the universal question list into a language specific question 73, which specifies exhaustively which phones conform to the articulatory characteristics asked by the question. Note that not all questions in the universal question list are applicable to the target language (for instance the nasal vowels do not exist in English but do exist in French). This is not an issue, since such non-applicable questions will find no match in the target language and will simply be discarded. The final step 74 uses the target language specific question list 73, to construct an acoustic decision tree for all triphones, A−B+C sharing the same center phone B using well known methods that maximize the likelihood of observing the data by selecting at each node in the tree the question that most increases likelihood. This top down approach is repeated until the increase in likelihood from further sub dividing the triphones falls under a certain threshold.

Clustered Triphone Training

Once the decision trees have been generated, the clustered triphones are trained using the entire target language database. The training uses well-known techniques for training clustered HMM models. See Step 6 of FIG. 2 (M/F separation, increase mixtures and variance tying). See Rabiner, L. and Juang, B.H., 1993, Fundamentals of Speech Recognition, Prentice Hall, N.J. and S. Young, D. Kershaw, J. Odell, D. Ollason V. Valttchev and P. Woodland, *The HTK Book (Version* 3.0), Cambridge, England, July 2000.

Use of Phonetic Tables in Other Supporting Operations

The result of step 5 in FIG. 2 is a set of trained triphone acoustic models that provide improved performance compared to the prior art methods of generating triphones.

A large variety of methods presently exist which improve upon an existing set of triphone models, such as increasing the number of parameters that describe the acoustic information for each HMM state, commonly referred to as increasing the number of mixture parameters. Other methods can extend the clustering in further manual steps to attempt to improve performance. These steps can also be applied to the triphone models produced in FIG. 2 step 5. In performing such methods, the phonetic table of this invention may be used in a variety of supporting ways to automate the steps of the methods, such as creating monophone lists. The large number of ways that the phonetic tables can be used to advantage will be understood by those skilled in the art.

While the applicant's preferred embodiment of acoustic modeling uses Hidden Markov Models (HMMs) and delivers trained triphones, the method can be extended to any type of speech modeling (dynamic time warping, etc) and training units (monophones, biphones, triphones etc.).

Iteration Using Different Triphone Clustering

The top-down approach of the clustering technique that adds a decision node on the binary tree is repeated until the increase in likelihood from further subdividing the triphones falls under a certain threshold. Furthermore, one can also force the groups of triphones to be populated with a minimum number of instances in the database. Setting the subdivision threshold and minimum population for each group to different values results in acoustic models with different recognition performance and size, for which a tradeoff must be made. Typically, it is time consuming to try several possibilities for setting those parameters and select the one set of parameters that maximizes performance either in general or for a specific maximum model size in particular. In the invention, however, the applicants teach utilizing the automatic and unsupervised training procedure to further optimize the performance (both in terms of model size and recognition accuracy) of the trained acoustic models by providing a feedback loop in FIG. 2 representing the overall training diagram.

EXAMPLE OF PERFORMANCE

The invention has been utilized to successfully train triphones in several languages, including American English, British English, German and Japanese. Repeatedly, it was seen that the proposed unsupervised training method outperformed the best handcrafted training method both in recognition accuracy and acoustic models size. For instance, when comparing continuous digit string recognition accuracy in American English, it was observed automatically trained triphone acoustic models lead to 1.26% word error rate, versus a rate of 2.30% for the manually trained models.

While the invention has been particularly shown and described with reference to a preferred embodiment, it will be understood by those skilled in the art that various changes inform and detail may be made without departing from the spirit and scope of the invention.

The invention claimed is:

1. A method for training acoustic models for a target language comprising the steps of:
    a) providing a phonetic table of a reference, which characterizes the phones used in one or more reference languages with respect to their articulatory properties;
    b) providing a phonetic table of a target language, which characterizes the phones used in the target language with respect to their articulatory properties;
    c) providing a set of trained monophones for each reference language;
    d) providing a database of utterances in the target language and phonetic transcription of the utterances in the database; and
    e) processing using table correspondence processing methods and phonetic model seeding wherein said processing step includes creating seed monophone models for the target language using the phonetic table of one or more reference languages, the phonetic models of the reference languages, and the phonetic table of the target language; and
    automatically performing triphone clustering based on the phonetic table of the reference and target language.

2. The method of claim 1 wherein said creating seed monophone models includes the steps of selecting for each phone in the target language, the phone in the reference language(s) that is the most similar in terms of articulatory characteristics defined in the phonetic table and based on the topology (number of states) of the target language phone and its best match in the reference language(s), the topology of the selected monophone model in the reference language(s) is modified to produce the seed monophone model of the target language phone.

3. The method of claim 1 wherein triphone clustering includes the steps of generating a list of articulatory based questions, transforming each question of a universal question list into a language specific question which specifies exhaustively which phones conform to the articulatory characteristics asked by the question based on the phonetic table of the target language, and constructing, for all A–B+C triphones sharing the same center phone B using the target language specific question list, an acoustic decision tree that maximizes the likelihood of observing the data by selecting at each node in the tree the question that most increases likelihood.

4. The method of claim 3 wherein different triphone clustering operations can be carried out using different clustering parameters (minimum population for each cluster and likelihood increase threshold) in order to further optimize the performance (in terms of recognition performance or model size) of the trained acoustic models.

5. A method of creating seed context-dependent phonetic models comprising the steps of:
    a) obtaining a first set of phonetic models representing a first set of phones;
    b) obtaining a transcription of a database in terms of the first set of phones;
    c) performing forced alignment of each utterance in a database using the first set of phonetic models and the transcription, resulting in the location of information in the database corresponding to each of the first phones in the database;
    d) generating the locations of each context-dependent phone in the database based on the locations of the first phones in the database and the context of the first phones specified by the transcription; and e) using the information in the database at all locations corresponding to a context-dependent phone constructing a context-dependent phonetic model for that context-dependent phone.

6. The method of claim 5 where the phonetic models are monophones.

7. The method of claim 5 where the context-dependent phonetic models are triphones.

8. A method for training acoustic models for a target language comprising the steps of:
   deriving and encoding providing phonetic tables of one or more reference languages and a phonetic table for a new target language,
   providing a speech database collected in the new language and a phonetic transcription of the database,
   processing using table correspondence to generate seed monophone phonetic models specific to the new target language,
   training the monophone phonetic models automatically using existing known training techniques, automatically generating accurate seed triphone models specific to the language subsequent to monophone model training,
   determining optimal clustering of the triphone phonetic model parameters utilizing the phonetic table information, and
   automatically training the triphone phonetic models.

9. The method of claim 8 including steps to optimize the resulting trained phonetic models to improve speech recognition performance within the training of the triphone acoustic models.

* * * * *